US012475208B2

(12) United States Patent
Shah et al.

(10) Patent No.: US 12,475,208 B2
(45) Date of Patent: Nov. 18, 2025

(54) SYSTEMS AND METHODS FOR INCREASED SECURITY IN CLUSTER FORMATION

(71) Applicant: Nutanix, Inc., San Jose, CA (US)

(72) Inventors: Alay Vyomeshbhai Shah, San Jose, CA (US); Alexander Michael Bunch, San Jose, CA (US); Sandeep Goutele, Bangalore (IN); Toms Varghese, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 88 days.

(21) Appl. No.: 18/669,491

(22) Filed: May 20, 2024

(65) Prior Publication Data

US 2025/0278470 A1 Sep. 4, 2025

(30) Foreign Application Priority Data

Mar. 1, 2024 (IN) .............................. 202441015236

(51) Int. Cl.
*G06F 21/40* (2013.01)
*G06F 21/45* (2013.01)

(52) U.S. Cl.
CPC .............. *G06F 21/40* (2013.01); *G06F 21/45* (2013.01)

(58) Field of Classification Search
CPC ................................. G06F 21/40; G06F 21/45
USPC ........................................................... 726/4
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 2020/0195743 | A1* | 6/2020 | Jiang ..................... H04L 67/568 |
| 2022/0222098 | A1* | 7/2022 | Srivastava .......... G06F 9/45558 |
| 2024/0370306 | A1* | 11/2024 | Hopper ................ G06F 9/5022 |

OTHER PUBLICATIONS

"Disable SSH access after creation of EKS Cluster #4690", Jan. 26, 2022, https://groups.google.com/g/rocks-clusters/c/xBEmY8w8DKs?pli=1.

(Continued)

*Primary Examiner* — Michael S McNally
(74) *Attorney, Agent, or Firm* — Foley & Lardner LLP (57) ABSTRACT

An apparatus may include one or more processors and non-transitory, computer-readable instructions which, when executed by the one or more processors, cause the one or more processors to receive, using a first security model, an indication to form a cluster including a set of nodes, establish, using the first security model, a connection with the set of nodes, in response to the set of nodes forming the cluster, automatically disable the first security model, and receive, as part of the cluster, using a second security model, a request directed to the cluster.

20 Claims, 4 Drawing Sheets

(56) References Cited

OTHER PUBLICATIONS

AWS, "How do I troubleshoot "Connection refused" or "Connection timed out" errors when I use SSH to connect to my EC2 instance?", 2025, https://repost.aws/knowledge-center/ec2-linux-resolve-ssh- connection-errors.
Broadcom, "VMware Aria Automation 8.14", 2025, https://techdocs.broadcom.com/us/en/vmware-cis/aria/aria-automation/8-14.html.
Cano, Ignacio, et al. "Curator: Self-Managing Storage for Enterprise Clusters" (Mar. 27, 2017), from https://www.usenix.org/conference/nsdi17/.
Cisco, "Cisco Expressway Cluster Creation and Maintenance", Dec. 2009, Cisco Expressway X8.10, https://www.cisco.com/c/dam/en/us/td/docs/voice_ip_comm/expressway/config_guide/X8- 10/Cisco-Expressway-Cluster-Creation-and-Maintenance-Deployment-Guide-X8-10.pdf.
Google Groups, "How to configure—user can access to computs node by ssh unless use qsub", https://groups.google.com/g/rocks-clusters/c/xBEmY8w8DKs?pli=1.
Netapp, "Manage SSH Functionality on the management node", https://docs.netapp.com/us-en/hci/docs/task_mnode_ssh_management.html#disable-or-enable-the-ssh-capability-on-the- management-node-using-netapp-hybrid-cloud-control-ui.
Netapp, "Ontap 9 Documentation", https://docs.netapp.com/us-en/ontap/system-admin/access-cluster-ssh-task.html.
Oracle, "Connect to a Cluster Node Through Secure Shell (SSH)", https://docs.oracle.com/en/cloud/paas/big-data-cloud/csbdi/connect-cluster-node-secure-shell.html#GUID-84261712-B6BA-4786-AE93-653B4AAF40B1.
Poitras, Steven. "The Nutanix Bible" (Jan. 11, 2014), from http://stevenpoitras.com/the-nutanix- bible/ (Publication date based on indicated capture date by Archive. org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix- bible/ (Publication date based on indicated capture date by Archive.org; first publication date unknown).
Poitras, Steven. "The Nutanix Bible" (Jan. 7, 2015), from http://stevenpoitras.com/the-nutanix- bible/ (Publication date based on indicated capture date by Archive.org; first publication date unknown).
Poitras, Steven. "The Nutanix Bible" (Jun. 9, 2015), from http://stevenpoitras.com/the-nutanix- bible/ (Publication date based on indicated capture date by Archive.org; first publication date unknown).
Stack Overflow, "How can I disable SSH on nodes in a GKE node pool?", Nov. 3, 2022, https://www.cisco.com/c/dam/en/us/td/docs/voice_ip_comm/expressway/config_guide/X8-10/Cisco-Expressway-Cluster-Creation-and-Maintenance-Deployment-Guide-X8-10.pdf.
Teleport, "Deploying a High Availability Teleport Cluster", https://goteleport. com/docs/admin- guides/deploy-a-cluster/high-availability/.

* cited by examiner

SYSTEMS AND METHODS FOR INCREASED SECURITY IN CLUSTER FORMATION

CROSS-REFERENCE TO RELATED APPLICATIONS

This application claims priority to Indian Provisional Application No.: 202441015236, filed Mar. 1, 2024 and titled "SYSTEMS AND METHODS FOR INCREASED SECURITY IN CLUSTER FORMATION," which application is incorporated herein by reference in its entirety.

BACKGROUND

A group of nodes may be used to form a cluster. However, security models for individual nodes are less secure than security models that leverage the architecture of the cluster. Monitoring nodes using a node-based security model may introduce security vulnerabilities into a cluster.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Cluster formation may include forming a set of nodes into a cluster. Security models used to communicate with the set of nodes may be less secure than security models which leverage an architecture of the cluster. As an example, a cluster may utilize quorum-based or consensus-based authentication or verification to prevent a single compromised node from compromising the cluster. Monitoring a node using a node-based security model may introduce a vulnerability into a cluster, allowing for attacks on the cluster. Conventional approaches require cluster users to manually configure security configurations of clusters. In these conventional approaches, users may neglect or forget to disable node-based security models, leaving clusters open to attack. Embodiments discussed herein provide consistent monitoring of nodes and clusters formed using the nodes with automatic transitions from node-based security models to cluster-based security models. In this way, the security of the cluster is increased without sacrificing visibility of the nodes and cluster.

Figure 1:
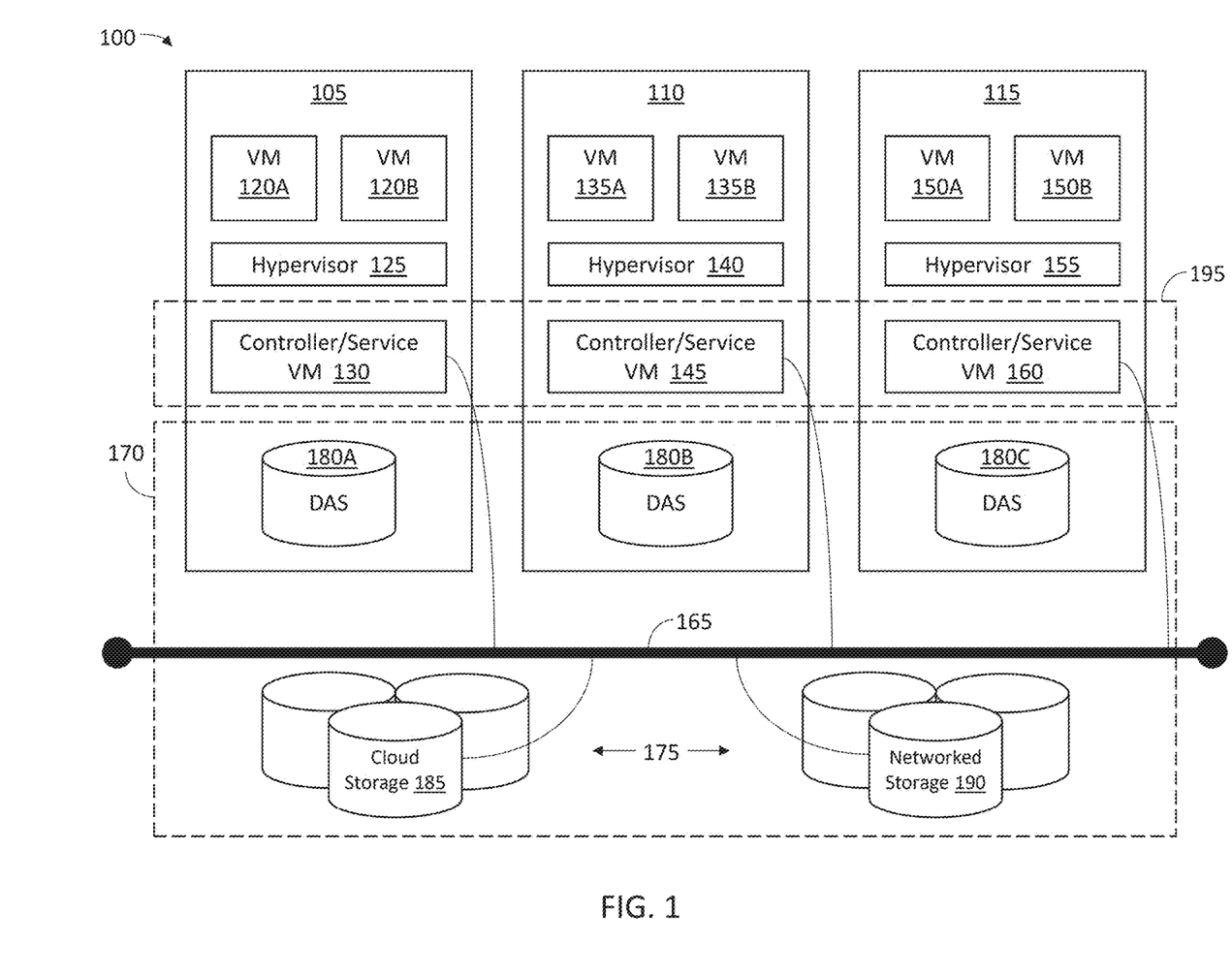
FIG. 1 illustrates an example cluster of a virtual computing system, in accordance with some embodiments of the present disclosure.

FIG. 1 illustrates an example cluster 100 of a virtual computing system, in accordance with some embodiments of the present disclosure. The cluster 100 may be incorporated in a cloud based implementation, an on-premise implementation, or a combination of both. The cluster 100 may be part of a hyperconverged system or any other type of system. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container system). In some embodiments, the controller/service VMs 130, 145, and 160 are not included in the cluster 100. The controller/service VMs 130, 145, and 160 may be in a first domain while the VMs 120, 135, and 150 are in a second domain. In an example, the controller/service VMs 130, 145, 160 are in a first cloud, the VMs 120 are in a second cloud, the VMs 130 are in a third cloud, and the VMs 150 are in a fourth cloud. In another example, the controller/service VMs 130, 140, 150 are in a first AWS account and the VMs 120, 135, and 150 are each in different, separate AWS accounts. Thus, the nodes 105, 110, and 115 may be nodes of various public or private clouds, with the controller/service VMs 130, 145, and 160 being separate from the VMs 120, 135, and 150. In an example, the controller/service VMs 130, 145, and 160 host a distributed control plane for managing the VMs 120, 135, and 150, where the VMs 120, 135, and 150 are database server VMs in public cloud accounts separate from a cloud account associated with the control plane.

The controller/service VMs 130, 145, and 160 can be considered a control plane and the VMs 120, 135, and 150 can be considered a data plane. The data plane may include data which is separate from the control logic executed on the control plane. VMs may be added to or removed from the data plane. AS discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165. It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may include a hardware device, such as a server. For example, in some embodiments, one or more of the first node 105, the second node 110, and the third node 115 may include a server computer provided by Nutanix, Inc., Dell, Inc., Lenovo Group Ltd. or Lenovo PC International, Cisco Systems, Inc., etc. In other embodiments, one or more of the first node 105, the second node 110, or the third node 115 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming languages, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VM 150A, and the database VM 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VM 150A, and the database VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfill the input/output request (and/or request another component within/outside the cluster 100 to fulfill that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 120, 135, and 150 are not in the same nodes as the controller/service VMs 130, 145, 160. The VMs 120, 135, and 150 may be located in a different cloud than the controller/service VMs 130, 145, 160.

Figure 2:
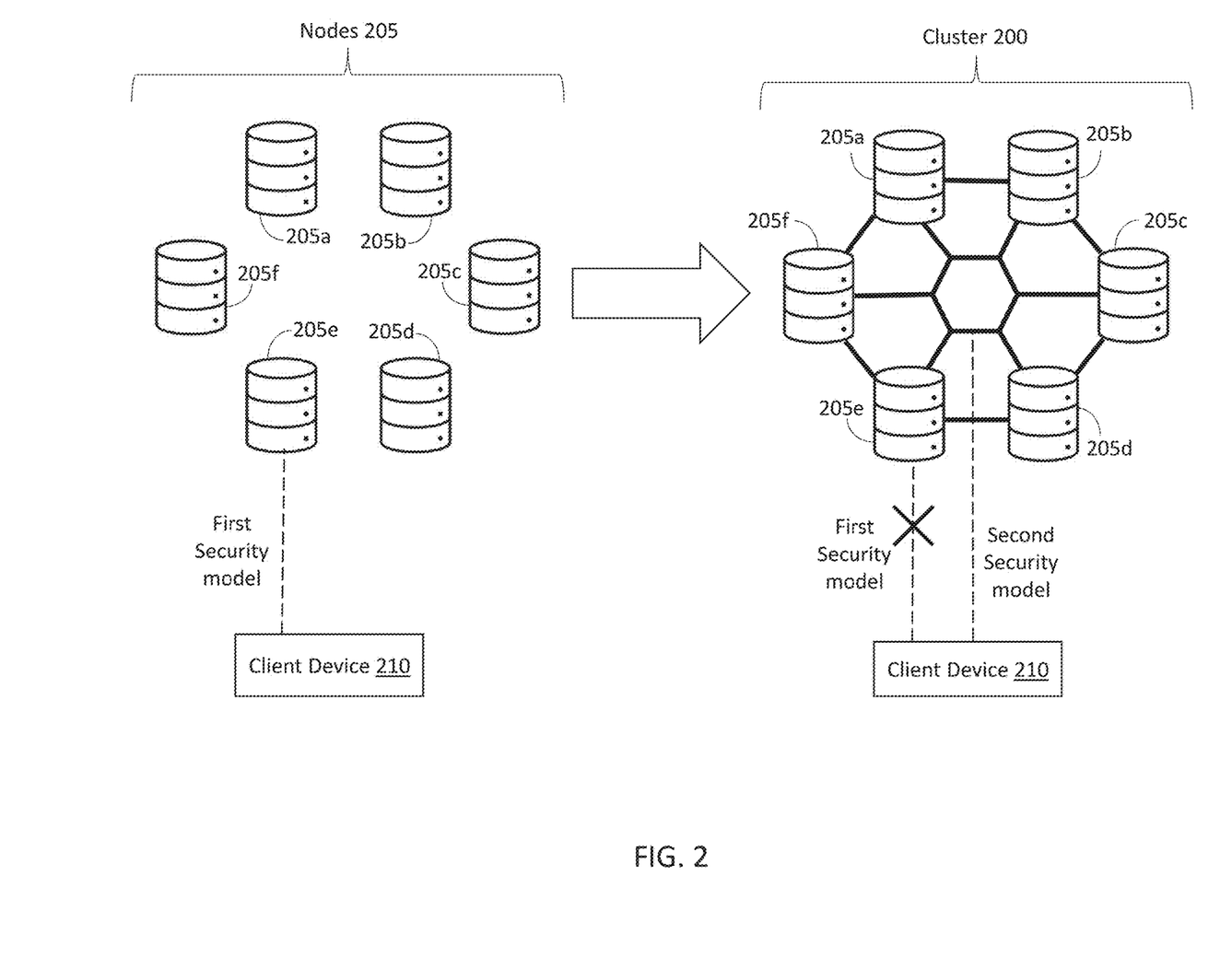
FIG. 2 illustrates an example of nodes forming a cluster, in accordance with some embodiments of the present disclosure.

FIG. 2 illustrates an example of nodes 205 forming a cluster 200, in accordance with some embodiments of the present disclosure. The cluster 200 may be similar to the cluster 100 of FIG. 1. The cluster 200 may include six nodes (205a, 205b, 205c, 205d, 205e, 205f), as illustrated, or any number of nodes. In an example, the cluster 200 may include three nodes, as illustrated in the cluster 100 of FIG. 1. The nodes 205 include the nodes 205a, 205b, 205c, 205d, 205e, 205f. The nodes 205 may, through a cluster formation process, form the cluster 200.

Before the cluster 200 is formed, the nodes 205 are separate nodes. In some implementations, the nodes 205 are unaware of each other. Each node of the nodes 205 may use a first security model for communication with a client device 210. The client device 210 may monitor the nodes 205 and/or one or more services running on the nodes 205. In an example, the client device 210 sends queries to the one or more services running on the nodes using the first security model. The first security model may be any security model for communication between the client device 210 and a node of the nodes 205. In an example, the first security model is Secure Shell (SSH). In an example, the first security model is remote procedure call (RPC). In an example, the first security model is a secure copy model (SCP). In some implementations, the first security model allows for log retrieval from the nodes 205.

During the cluster formation process, the nodes 205 communicate among themselves to establish connections and begin forming the cluster 200. In an example, the nodes 205 send messages via HTTP to each other to establish connections between the nodes 205. The nodes 205 may each individually use the first security model to communicate with the client device 210 before the cluster is formed. The nodes 205 may transition to using a second security model once the cluster 200 is formed. The second security model may be cluster-based, such that communications between the client device 210 and the cluster 200 using the second security model have a higher level of security than communications between the client device 210 and the nodes 205 using the first security model. In an example, the second security model may be HTTPS between the client device 210 and the cluster. In an example, the cluster 200 may utilize quorum-based verification in the second security model. In this way, communications between the client device 210 and the cluster 200 may be more secure than communications between the client device 210 and the nodes 205, as one compromised node in the cluster 200 does not compromise the cluster 200. In an example, an attack on a node in the cluster 200 does not cause the cluster 200 to be compromised, but instead alerts the cluster to the attack, as the attacked node does not agree with the other nodes 205 in the cluster 200.

Once the cluster is formed 200 and/or during the cluster formation process, the cluster 205 may automatically disable the first security model. In an example, once the cluster is formed and the second security model is active, the nodes 205 of the cluster automatically close SSH ports used for the first security model. In this way, security of the cluster 200 is improved, as automatically disabling the first security model removes a less secure communication pathway for communicating with the nodes 205 of the cluster. The client device 210 may only be able to communicate with the cluster 200 using the second security model, as the first security model for communicating with the nodes 205 is disabled. In this way, the security of the cluster 200 is improved, as the quorum-based verification provided by the cluster 200 may be implemented for all communications between the client device 210 and the cluster 200.

The client device 210 may monitor the cluster 200 and cluster services running on the cluster 200 using the second security model. The client device 210 may send a cluster status request to the cluster 200 using the second security model to determine a status of the cluster 200. In this way, the client device 210 may directly query whether the cluster 200 is formed.

In some implementations, the nodes 205 of the cluster 200 may communicate with each other using the second security model. In some implementations, the nodes 205 of the cluster 200 may communicate with each other using a third security model. In an example, the cluster 200 communicates with the client device 210 using Transport Layer Security (TLS) while the nodes 205 of the cluster 200 communicate with each other using mutual TLS (mTLS).

Figure 3:
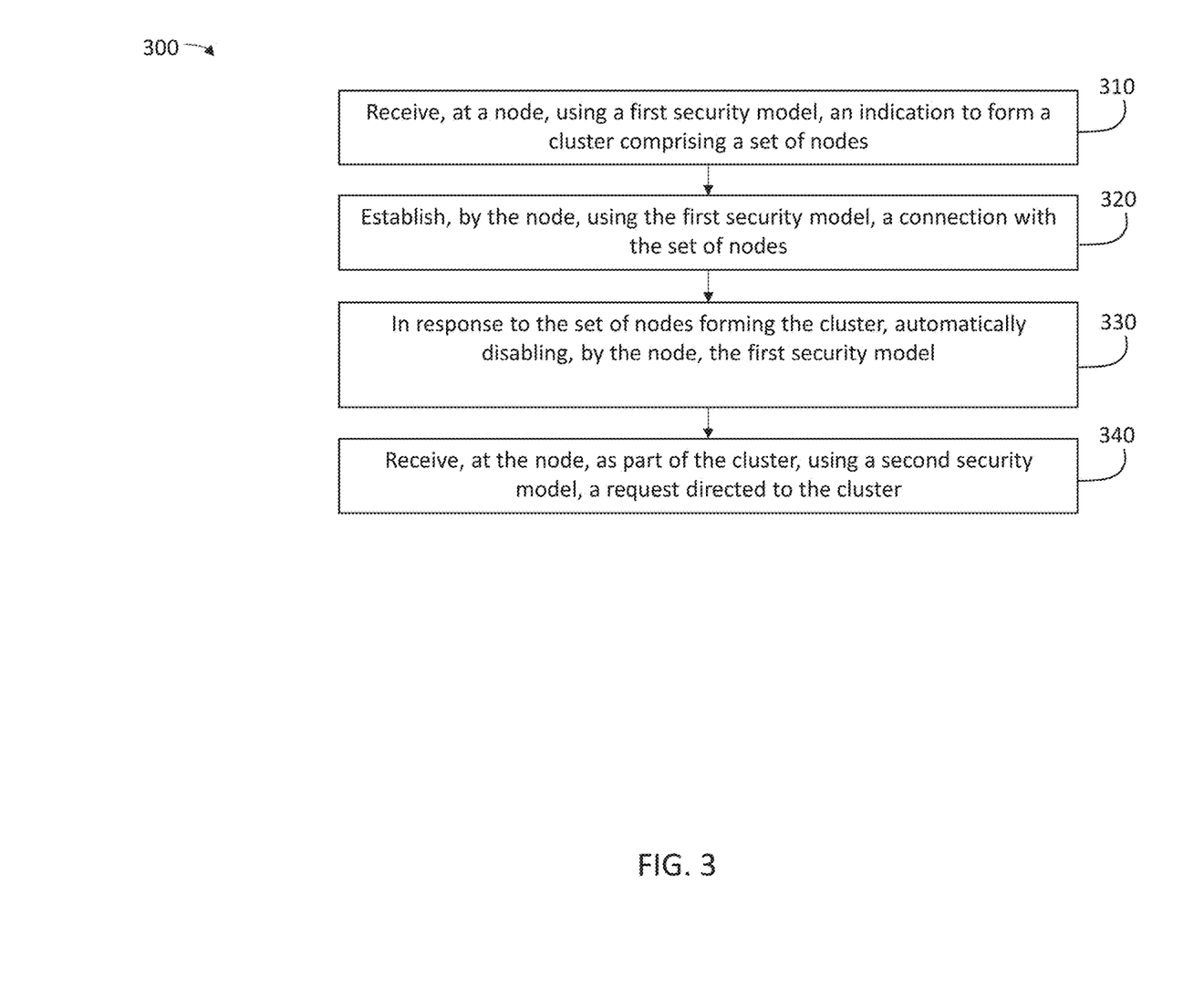
FIG. 3 is an example flow diagram of a method for transitioning from a first security model to a second security model during cluster formation, in accordance with some embodiments of the present disclosure.

FIG. 3 is an example flow diagram of a method 300 for transitioning from a first security model to a second security model during cluster formation, in accordance with some embodiments of the present disclosure. The method 300 may include more, fewer, or different operations than shown. The operations may be performed in the order shown, a different order, or concurrently. The method 300 may be performed by a node of the nodes 205 of FIG. 2.

At operation 310, a node receives, at the node, using a first security model, an indication to form a cluster including a set of nodes. The set of nodes may include the node. In some implementations, the node receives the indication from a client device. In some implementations, the node receives the indication from a node of the set of nodes.

In some implementations, the indication to form the cluster includes identifiers of the set of nodes. In an example, the indication to form the cluster includes IP addresses of the set of nodes. The IP addresses of the set of nodes may allow the set of nodes to communicate with each other to form the cluster. The cluster may be defined by the set of nodes, as identified in the indication to form the cluster. In some implementations, the indication to form the cluster includes a configuration of the cluster, including the identifiers of the set of nodes as well as an architecture for the nodes to interact to form the cluster.

In some implementations, each node of the set of nodes receives, using the first security model, the indication to form the cluster. In an example, each node of the set of nodes receives the indication to form the cluster such that the set of nodes can establish trusted connections with each other. In some implementations, a first node of the set of nodes receives an indication to establish connections with the other nodes in the set of nodes and the other nodes receive an indication to expect communications from the first node. In some implementations, multiple connector nodes receive indications to establish connections with receiver nodes and the receiver nodes receive indications to accept communications from the connector nodes.

At operation 320, the node establishes a connection with the set of nodes. In some implementations, the node establishes the connection with the set of nodes using the first security model. In some implementations, the node establishes the connection with the set of nodes using another security model. In some implementations, the method 300 includes transmitting, by the node, one or more messages to the set of nodes to form the cluster. The node may transmit the one or more messages using the first security model or another security model, such as a lower security model than the first security model. In an example, the first security model is SSH and the node transmits the one or more messages using RPC. The one or more messages may include the indication to form the cluster. The one or more messages may include commands or instructions to form the cluster. In an example, a service running on the node may send messages to similar services running on the set of nodes to establish keys for secure connections between the nodes. In an example, a service running on the node may send messages to similar services running on the set of nodes to establish a quorum-based decision-making between the nodes for the cluster. In an example, a service running on the node may send messages to similar services running on the set of nodes to determine how resources are shared between the nodes in the cluster and how redundancy of storage will be implemented in the cluster. In this example, the indication to form the cluster may include a configuration for the cluster which indicates how the resources are shared between the nodes in the cluster and how the redundancy of storage will be implemented in the cluster.

At operation 330, the node automatically disables the first security model in response to the set of nodes forming the cluster. In some implementations, the node automatically disables the first security model at the node in response to the set of nodes forming the cluster. In some implementations, the node, in response to the cluster being formed, sends messages to the set of nodes to automatically disable the first security model. In some implementations, each node of the set of nodes automatically disables the first security model in response to the set of nodes forming the cluster. In some implementations, the first security model is automatically disabled in response to a second security model implemented by the cluster being active. In an example, the first security model is disabled in response to a cluster-based security model being active. In an example, SSH is disabled in response to TLS being active at the cluster. In an example, SSH connections between the set of nodes and the client device are disabled in response to a TLS connection between the cluster and the client device being established.

In some implementations, disabling the first security model includes closing one or more ports associated with the first security model. In an example, disabling the first security model includes automatically closing SSH ports at the set of nodes.

At operation 340, the node receives, as part of the cluster, using a second security model, a request directed to the cluster. In some implementations, the cluster receives the request directed to the cluster directly from the client device, In some implementations, the cluster receives the request directed to the cluster from another node in the cluster. The request directed to the cluster may be sent from the client device to the cluster. In some implementations, the client device sends the request to an IP address of the cluster different from the IP addresses of the nodes of the cluster.

In some implementations, the request directed to the cluster includes a request for a cluster formation status of the cluster. In this way, the cluster formation status can be determined directly, without querying the status of the services running on the cluster. In some implementations, the request directed to the cluster includes an API call to the cluster to access the cluster. In some implementations, the cluster responds to the request using a quorum-based response based on a quorum of the nodes of the cluster reaching a consensus on a response to the request.

In some implementations, the first security model is a node-based security model and the second security model is a cluster-based security model. In this way, the second security model may be more secure than the first security model, as one compromised node in the cluster does not compromise the cluster, but alerts the cluster that the compromised node is compromised.

In some implementations, the second security model includes quorum-based verification from the set of nodes forming the cluster. As discussed herein, the quorum-based verification of the cluster provides security against a compromised node, as a single compromised node does not compromise the cluster. In an example, the cluster receives a malicious request and a compromised node indicates that the cluster should respond with information requested in the malicious request. In this example, a quorum of nodes of the cluster indicates that the cluster should not respond with the information requested in the malicious request, preventing the compromised node from responding with the information, and making the cluster aware that the compromised node is compromised. In an example, the cluster receives a malicious request which is authenticated by a compromised node of the cluster but which is not authenticated by a quorum of nodes of the cluster and thus not authenticated.

In some implementations, the second security model includes authenticating requests to the cluster using a cluster-level password. In an example, the second security model includes communications over HTTPS with password authentication. In some implementations, the indication to form the cluster includes the cluster-level password. In an example, the indication to form the cluster includes a password which is used in forming the cluster such that the cluster requires the password for authentication. In some implementations, the indication to form the cluster includes an ephemeral password generated by the client device which is replaced by a user-designated password once the cluster is formed. In this way, the client device can access the cluster using the ephemeral password and then reset the password to the user-designated password to provide access to the client device and then transfer access to the user with the user-designated password. In this way, the client device may monitor the status of the cluster as the cluster is formed and pass control to the user, indicating that the cluster is formed and operational.

Figure 4:
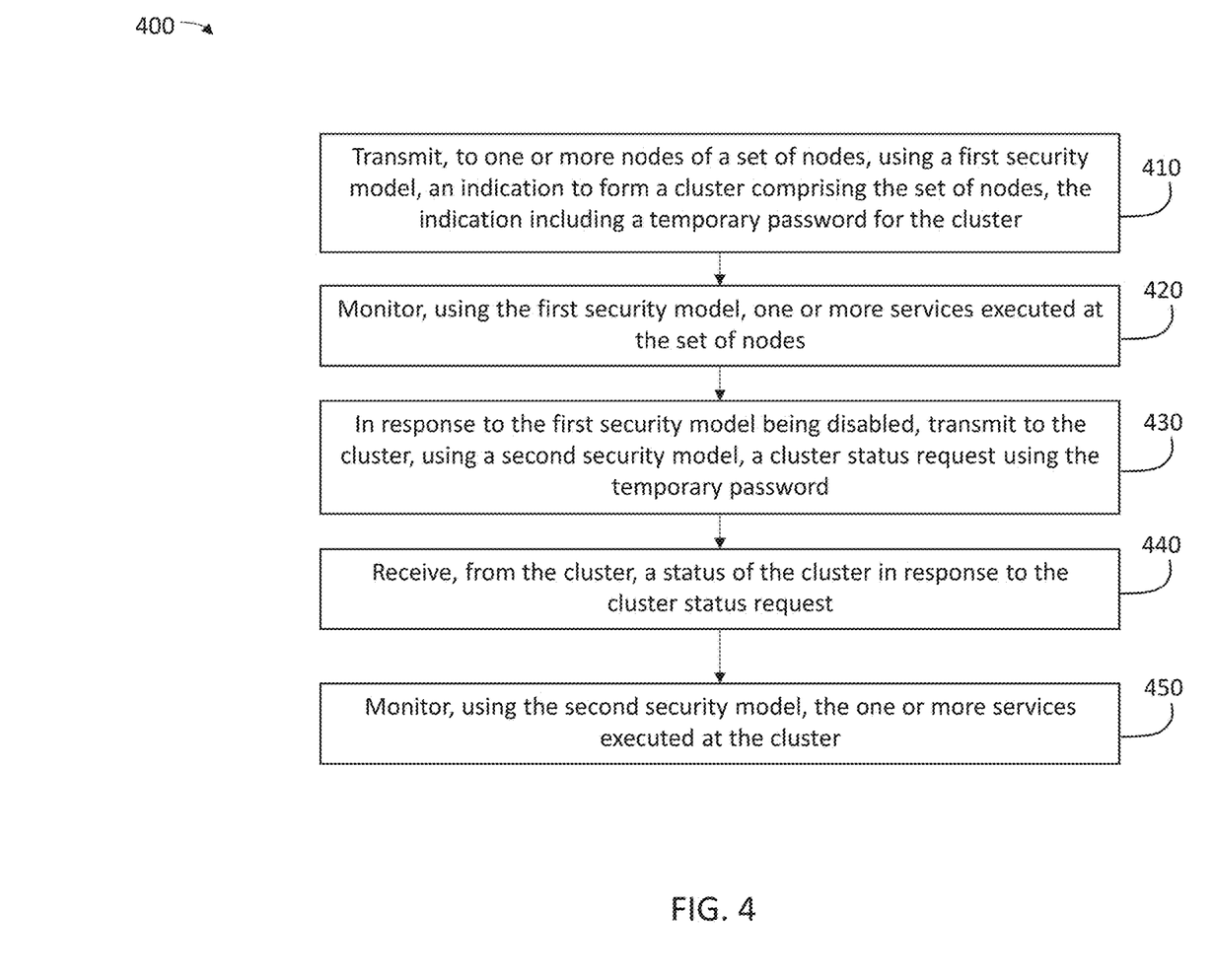
FIG. 4 is an example flow diagram of a method for monitoring cluster formation and transitioning from a first security model to a second security model during cluster formation, in accordance with some embodiments of the present disclosure.

FIG. 4 is an example flow diagram of a method for monitoring cluster formation and transitioning from a first security model to a second security model during cluster formation, in accordance with some embodiments of the present disclosure. The method 400 may include more, fewer, or different operations than shown. The operations may be performed in the order shown, a different order, or concurrently. The method 400 may be performed by the client device 210 of FIG. 2. In some implementations, the method 400 corresponds to the method 300 of FIG. 3, where the method 400 is performed by the client device 210 of FIG. 2 and the method 300 is performed by a node of the nodes 205 of FIG. 2. While the method 400 is described as being performed by a client device, such as the client device 210 of FIG. 2, the method 400 may be performed by other devices.

At operation 410, a client device transmits, to one or more nodes of a set of nodes, using a first security model, an indication to form a cluster comprising the set of nodes, the indication including a temporary password for the cluster. The indication to form the cluster may include IP addresses and/or identifiers of the set of nodes.

At operation 420, the client device monitors, using the first security model, one or more services executed at the set of nodes. In some implementations, the client device queries each node of the set of nodes to monitor the one or more services executed at the set of nodes. In an example, the client device sends messages over the first security model (i.e. SSH, etc.) to the set of nodes to query the one or more services executed at the set of nodes. In some implementations, monitoring the one or more services executed at the set of nodes includes monitoring a status of the one or more services to determine whether the one or more services are operational.

At operation 430, the client device, in response to the first security model being disabled, transmits to the cluster, using a second security model, a cluster status request using the temporary password. As discussed herein, the first security model may be automatically disabled at the nodes of the cluster in response to the cluster being formed. In some implementations, the client device determines that the first security model is disabled in response to a request to one or more nodes of the cluster using the first security model being denied or rejected due to the first security model being disabled. In an example, the client device determines that the first security model has been disabled based on an SSH message to a node of the cluster not being delivered due to an SSH port at the node being closed.

In some implementations, the cluster status request may be a request to determine a status of the cluster. In this way, the client device may directly determine the status of the cluster (e.g., whether the cluster is successfully formed). The cluster status request may include a request for a status of one or more services running on the cluster. The one or more services running on the cluster may include the one or more services running on the nodes prior to formation of the cluster as well as additional services.

In some implementations, the temporary password may include ephemeral credentials for cluster creation used by the client device. In some implementations, the client device resets the password for the cluster from the temporary password to a user-designated password. In some implementations, a user provides the user-designated password to the client device when the user instructs the client device to begin the cluster formation process. In this way, the client device is able to form the cluster and set the password of the cluster to the user-designated password without transmitting the user-designated password over the first security model.

In some implementations, the cluster creates its own root certificate. In an example, the client device requests a node which will be part of the cluster to create the cluster root certificate and then uses the cluster root certificate when forming the cluster. The client device may receive the public key of the root certificate. In this way, the client device has the public key of the root certificate before cluster formation and before the transition from the first security model to the second security model. The client device having the public key of the cluster root certificate before the cluster is formed prevents impersonation of the client device by attackers during cluster formation and after cluster formation.

At operation 440, the client device receives, from the cluster, a status of the cluster in response to the cluster status request. The client device may determine, based on the status of the cluster, that the cluster was successfully formed and that the second security model is active. The client device may inform the user that the cluster is formed and operational. In this way, the client device can inform the user as to the formation of the cluster such that the user can know that the cluster is formed without attempting to access the cluster.

In some implementations, the cluster status request includes a request for a cluster version of the cluster. In an example, the client device queries the cluster version of the cluster and determines that the cluster is active and able to reach consensus in response to the cluster responding with the cluster version of the cluster and determines that the cluster is not active or not able to reach consensus in response to the cluster responding "not available."

In some implementations, the client device queries the cluster as to the nodes in the cluster. As the client device knows the set of nodes that should be in the cluster, as identified in the indication to form the cluster, the client device can verify whether the cluster includes all of the intended nodes, or the nodes intended to be included in the cluster in the indication to form the cluster.

In some implementations, the client device indicates to the user that the cluster is successfully formed once the client device is able to authenticate with the cluster using the user-designated password, is able to determine that the cluster includes all of the intended nodes, and the client device receives a response from the cluster that indicates that the cluster is able to reach consensus.

At operation 450, the client device monitors, using the second security model, the one or more services executed at the cluster. The client device may monitor the cluster status and/or the one or more services using the second security model. In this way, the client device is able to monitor the one or more services executed on the nodes using the first security model before the cluster is formed and is able to monitor the one or more services executed on the cluster after the cluster is formed, allowing the cluster device continual monitoring access before and after the cluster is formed. In some implementations, the monitored node provides a status of the set of nodes to the client device using the first security model prior to the first security model being disabled and provides a status of the cluster to the client device using the second security model after the first security model is disabled.

While embodiments have been discussed herein relative to cluster formation, automatic transitions from the first security model to the second security model are also considered. In an example, a client device may send a message to a cluster to automatically disable the first security model. In an example, the client device may send a message to a cluster to automatically close SSH ports of the nodes of the clusters. In this way, existing clusters may gain increased security by disabling the first security model and using only the second, cluster-based, security model.

Aspects of the present disclosure are directed to an example apparatus including one or more processors and non-transitory, computer-readable instructions which, when executed by the one or more processors, cause the one or more processors to receive, using a first security model, an indication to form a cluster including a set of nodes, establish, using the first security model, a connection with the set of nodes, in response to the set of nodes forming the cluster, automatically disable the first security model, and receive, as part of the cluster, using a second security model, a request directed to the cluster.

The first security model may be a node-based security model, and the second security model may be a cluster-based security model. The second security model may include quorum-based verification from the set of nodes forming the cluster. The indication to form the cluster may include identifiers of the set of nodes. In some implementations, each node of the set of nodes receives, using the first security model, the indication to form the cluster. In some implementations, disabling the first security model includes closing one or more ports associated with the first security model. In some implementations, the request directed to the cluster includes a request for a cluster formation status of the cluster. In some implementations, the second security model includes authenticating requests to the cluster using a cluster-level password. In some implementations, the indication to form the cluster includes the cluster-level password. In some implementations, the instructions further cause the one or more processors to transmit, using the first security model, one or more messages to the set of nodes to form the cluster. In some implementations, the one or more processors provide a status of the set of nodes to a client device using the first security model prior to the first security model being disabled and provide a status of the cluster to the client device using the second security model after the first security model is disabled.

Aspects of the present disclosure are directed to an example method including receiving, at a node, using a first security model, an indication to form a cluster including a set of nodes, establishing, by the node, using the first security model, a connection with the set of nodes, in response to the set of nodes forming the cluster, automatically disabling, by the node, the first security model, receiving, at the node, as part of the cluster, using a second security model, a request directed to the cluster.

While various aspects of the present disclosure have been discussed in relation to or as being performed by services, the same discussion applies equally to containerized services, or containers.

In some implementations, the first security model is a node-based security model, and wherein the second security model is a cluster-based security model. In some implementations, the second security model includes quorum-based verification from the set of nodes forming the cluster. In some implementations, the indication to form the cluster includes identifiers of the set of nodes. In some implementations, each node of the set of nodes receives, using the first security model, the indication to form the cluster. In some implementations, disabling the first security model includes closing one or more ports associated with the first security model. In some implementations, the request directed to the cluster includes a request for a cluster formation status of the cluster. In some implementations, the second security model includes authenticating requests to the cluster using a cluster-level password. In some implementations, the indication to form the cluster includes the cluster-level password. In some implementations, the method includes transmitting, by the node, using the first security model, one or more messages to the set of nodes to form the cluster. In some implementations, the node provides a status of the set of nodes to a client device using the first security model prior to the first security model being disabled and provides a status of the cluster to the client device using the second security model after the first security model is disabled. In some implementations, the first security model is a node-based security model, and wherein the second security model is a cluster-based security model. In such implementations, the second security model includes quorum-based verification from the set of nodes forming the cluster. In such implementations, the indication to form the cluster includes identifiers of the set of nodes. In such implementations, each node of the set of nodes receives, using the first security model, the intention to form the cluster. In such implementations, disabling the first security model includes closing one or more ports associated with the first security model in addition to establishing other services responsible to form quorum and trust by other means that described security model here by. In such implementations, the second security model includes authenticating requests to the cluster using a cluster-level password.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An apparatus comprising one or more processors and non-transitory, computer-readable instructions which, when executed by the one or more processors, cause the one or more processors to:
   receive, using a first security model, an indication to form a cluster including a set of nodes;
   establish a connection with the set of nodes;
   in response to the set of nodes forming the cluster, automatically disable the first security model; and
   receive, as part of the cluster, using a second security model, a request directed to the cluster.

2. The apparatus of claim 1, wherein the first security model is a node-based security model, and wherein the second security model is a cluster-based security model.

3. The apparatus of claim 1, wherein the second security model includes quorum-based verification from the set of nodes forming the cluster.

4. The apparatus of claim 1, wherein each node of the set of nodes receives, using the first security model, the indication to form the cluster.

5. The apparatus of claim 1, wherein disabling the first security model includes closing one or more ports associated with the first security model.

6. The apparatus of claim 1, wherein the request directed to the cluster includes a request for a cluster formation status of the cluster.

7. The apparatus of claim 1, wherein the second security model includes authenticating requests to the cluster using a cluster-level password.

8. The apparatus of claim 7, wherein the indication to form the cluster includes the cluster-level password.

9. The apparatus of claim 1, wherein the instructions further cause the one or more processors to transmit one or more messages to the set of nodes to form the cluster.

10. The apparatus of claim 1, wherein the instructions further cause the one or more processors to:
    provide a status of the set of nodes to a client device using the first security model prior to the first security model being disabled; and
    provide a status of the cluster to the client device using the second security model after the first security model is disabled.

11. A method comprising:
    receiving, at a node, using a first security model, an indication to form a cluster comprising a set of nodes;
    establishing, by the node, a connection with the set of nodes;
    in response to the set of nodes forming the cluster, automatically disabling, by the node, the first security model;
    receiving, at the node, as part of the cluster, using a second security model, a request directed to the cluster.

12. The method of claim 11, wherein the first security model is a node-based security model, and wherein the second security model is a cluster-based security model.

13. The method of claim 11, wherein the second security model includes quorum-based verification from the set of nodes forming the cluster.

14. The method of claim 11, wherein each node of the set of nodes receives, using the first security model, the indication to form the cluster.

15. The method of claim 11, wherein disabling the first security model includes closing one or more ports associated with the first security model.

16. The method of claim 11, wherein the request directed to the cluster includes a request for a cluster formation status of the cluster.

17. The method of claim 11, wherein the second security model includes authenticating requests to the cluster using a cluster-level password.

18. The method of claim 17, wherein the indication to form the cluster includes the cluster-level password.

19. The method of claim 11, further comprising transmitting, by the node, one or more messages to the set of nodes to form the cluster.

20. The method of claim 11, further comprising:
providing a status of the set of nodes to a client device using the first security model prior to the first security model being disabled; and
providing a status of the cluster to the client device using the second security model after the first security model is disabled.

* * * * *